United States Patent [19]

Sullivan

[11] 4,403,210
[45] Sep. 6, 1983

[54] BRAKE LIGHT ENHANCER CIRCUIT

[75] Inventor: Patrick O. Sullivan, Oceanside, Calif.

[73] Assignee: P. Sully Co., Oceanside, Calif.

[21] Appl. No.: 343,843

[22] Filed: Jan. 29, 1982

[51] Int. Cl.³ .............................................. B60Q 1/44
[52] U.S. Cl. ...................................... 340/72; 340/71; 340/73; 340/67
[58] Field of Search ...................... 340/72, 71, 69, 66, 340/67, 73, 74, 78, 84, 81 R; 307/10 LS

[56] References Cited

U.S. PATENT DOCUMENTS

| | | | |
|---|---|---|---|
| 2,090,332 | 8/1937 | O'Neil | 315/79 |
| 2,405,843 | 8/1946 | Moe | 340/659 |
| 2,685,048 | 7/1954 | Schweitzer | 315/79 |
| 2,751,575 | 6/1956 | Jacobs et al. | 340/72 |
| 2,906,928 | 9/1959 | Klein | 340/659 |
| 3,309,562 | 3/1967 | Schultz | 340/77 |
| 3,337,846 | 8/1967 | Hollins | 340/81 |
| 3,364,384 | 1/1968 | Dankert | 340/66 |
| 3,528,056 | 9/1970 | Voevodsky | 340/72 |
| 3,648,101 | 3/1972 | Suzuki | 340/76 |
| 4,155,069 | 5/1979 | Mason | 340/73 |

Primary Examiner—Donnie L. Crosland
Attorney, Agent, or Firm—Brown & Martin

[57] ABSTRACT

A brake light enhancer circuit which may be inserted into a conventional motor vehicle lighting system to provide a more eye catching braking or deceleration signal to following drivers. The circuit may be connected between the rear signal lamps, brake light switch and flasher in a conventional vehicle lilghting system. It may include a timer or pulse generator, a counter and a disable latch. In motor vehicles having a pair of left and right turn signal lamps and a pair of left and right brake lamps, closure of the brake light switch when the turn signal switch is in its neutral position will cause the brake lamps to flash on and off a predetermined number of times and to thereafter remain continuously illuminated. When the turn signal switch is moved to either its left or right turn position, the brake light enhancer circuit is disabled so that turn and brake light signals are conventional, thereby preventing confusion of following drivers.

4 Claims, 3 Drawing Figures

BRAKE LIGHT ENHANCER CIRCUIT

BACKGROUND OF THE INVENTION

The present invention relates to motor vehicle signal light systems, and more particularly, to a brake light enhancer circuit which may be inserted into a conventional motor vehicle lighting system to provide a more eye catching braking or deceleration signal to following drivers.

It has long been known that intermittently flashing or pulsing lights attract more attention than lights which are steadily or continuously illuminated. Thus flashing turn signal lights are used on the rear of motor vehicles to insure that following drivers are warned of an impending turn. It is conventional, however, to provide left and right rear brake lamps which are continuously illuminated so long as a brake light switch remains closed by continuous pressure on the brake pedal.

SUMMARY OF THE INVENTION

It is therefore the primary object of the present invention to provide a circuit for enhancing the signal provided by the brake lights of a conventional motor vehicle so that it will be more eye catching to following drivers.

Another object of the present invention is to provide a brake light enhancer circuit which will cause the brake lamps to flash on and off a predetermined number of times before remaining continuously on.

Yet another object of the present invention is to provide a brake light enhancer circuit which will not interfere with normal turn signal operation.

Yet another object of the present invention is to provide a brake light enhancer circuit which can be readily connected to existing automobile signel lighting systems.

Still another object of the present invention is to provide a brake light enhancer circuit which may be utilized in motor vehicles having rear lamps which function both as brake and turn signal lamps, as well as in vehicles having separate brake and turn signal lamps.

Accordingly, the present invention provides a brake light enhancer circuit which may be inserted into a conventional motor vehicle lighting system to provide a more eye catching braking or deceleration signal to following drivers. The circuit may be connected between the rear signal lamps, brake light switch and flasher in a conventional vehicle lighting system. It may include a timer or pulse generator, a counter and a disable latch. In motor vehicles having a piar of left and right turn signal lamps and a pair of left and right brake lamps, closure of the brake light switch when the turn signal switch is in its neutral position will cause the brake lamps to flash on and off a predetermined number of times and to thereafter remain continuously illuminated. When the turn signal switch is moved to either its left or right turn position, the brake light enhancer circuit is disabled so that turn and brake light signals are conventional, thereby preventing confusion of following drivers.

DESCRIPTION OF THE PREFERRED EMBODIMENT

Figure 1:
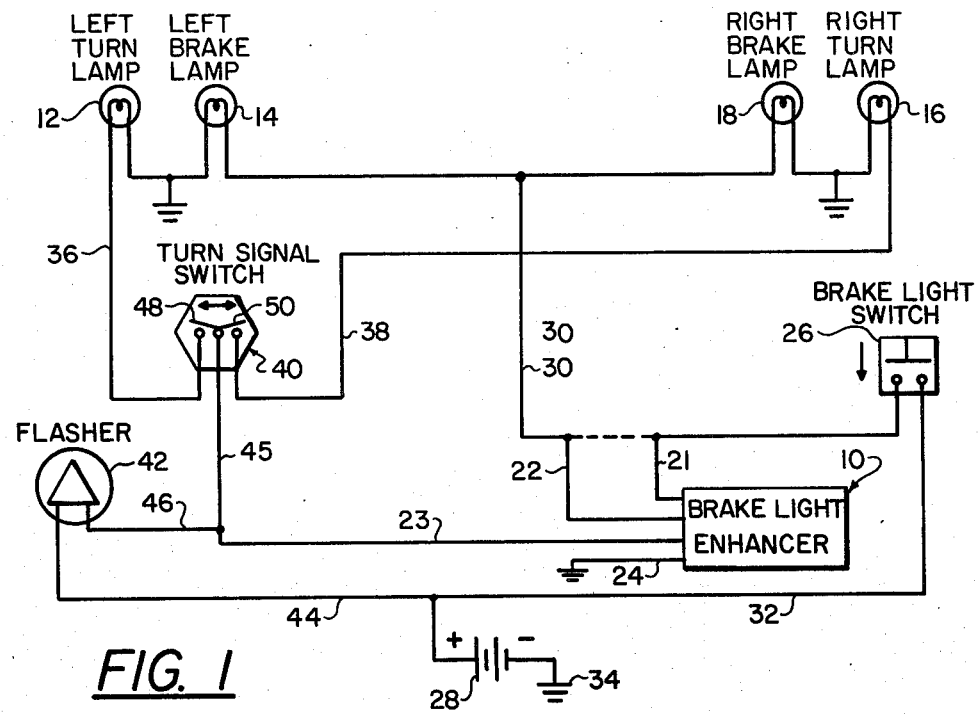
FIG. 1 is a schematic diagram illustrating the manner in which the brake light enhancer circuit of the present invention may be utilized in a motor vehicle lighting system having separate turn signal and brake lamps.

FIG. 1 illustrates the connection of a preferred embodiment 10 of my brake light enhancer circuit to the signal lighting system of an automobile having left turn signal and brake lamps 12 and 14, and right turn signal and brake lamps 16 and 18. Except for the connection of the brake light enhancer circuit 10 through leads 21 through 24, the circuit of FIG. 1 is conventional for many modern automobiles. A brake light switch 26 is connected between the brake lamps 14 and 18 and the positive terminal of a battery 28 through conductors 30 and 32. When my brake light enhancer circuit 10 is inserted into the vehicle lighting system, the conductor 30 is cut as indicated by the phantom line. The portion of the cut conductor 30 which is connected to one side of the brake light switch 26 is connected to the lead 21 of the brake light enhancer circuit 10. The other portion of the cut conductor 30 is connected to the lead 22 of the brake light enhancer circuit 10. Both the lead 24 of the brake light enhancer circuit 10 and the negative terminal of the battery 28 are connected to a ground 34.

The lamps 12, 14, 16 and 18 have filaments which are each connected on one side to the ground. The other sides of the filaments of the brake lamps 14 and 18 are connected to the conductor 30. The other sides of the filaments of the turn signal lamps 12 and 16 are connected through conductors 36 and 38 to the side terminals or contacts of a conventional lever operated turn signal switch 40. A conventional thermal flasher 42 is connected between the positive terminal of the battery and the center terminal of the turn signal switch 40. A first side of the flasher 42 is connected to the positive terminal of the battery through a conductor 44. The second side of the flasher is connected to the center terminal 45 of the turn signal switch through a conductor 46. The lead 23 of the brake light enhancer circuit 10 is also connected to the second side of the flasher.

As mentioned above, except for the indicated addition of the brake light enhancer circuit 10, the signal light system of FIG. 1 is conventional. Thus, its normal operation with leads 21 through 24 eliminated and conductor 30 uncut is as follows. When the driver depresses the brake pedal, switch 26 closes. Current then flows from the positive terminal of the battery 28, through the conductor 30 and through each of the filaments of the left and right brake lamps 14 and 18 to ground. Thus, the brake lamps are continuously illuminated so long as pressure is maintained on the brake pedal which is sufficient to keep the switch 26 closed.

The turn signal switch 40 may be manually actuated from a neutral position, to a left or right turn position. Such manual actuation is normally accomplished through the movement of a turn signal lever adjacent the steering column of the automobile. When the lever is moved to its left turn position. A movable contact 48 connects the conductors 36 and 46. Intermittent current from the flasher 42 passes through the filament of the left turn signal lamp 12 to ground. Thus, the left turn signal lamp flashes intermittently.

When the turn signal lever is moved to its right turn position, another movable contact 50 (FIG. 1) connects the conductors 38 and 46. At the same time the movable contact 48 also moves, breaking the connection between the conductors 36 and 46. Intermittent current now flows from the flasher 42 now flows through the filament of the right turn signal lamp 16 to ground, causing this lamp to flash intermittently.

In the conventional form of the signal lighting system of FIG. 1, without my brake light enhancer, brake light operation does not interfere with turn signal operation. When the turn signal switch lever is in its neutral position, neither one of the conductors 36 and 38 is connected to the conductor 46.

The operation of the vehicle lighting system of FIG. 1 with the addition of my brake light enhancer circuit 10, as indicated, is as follows. When the brake light switch 26 is closed, the brake lamps 14 and 18 flash on and off a predetermined number of times and thereafter remain continuously illuminated. If at any time during the closure of the brake light switch the turn signal switch is actuated to its left or right turn positions, the brake lamps are continuously illuminated and the appropriate one of the turn signal lamps flashes on and off to indicate a turn in the usual manner. The on and off flashing of the appropriate turn signal lamp continues as long as the turn signal switch is still actuated in that given position. The brake light enhancer circuit is also disabled and turn signal operation is normal if the turn signal switch is first actuated to its left or right turn position and thereafter the brake light switch is closed.

By intermittently flashing or pulsing the brake lights a given number of times, for example three times, when the brake light switch is first depressed, a more eye catching signal is provided to following drivers warning them of the fact that the car is decelerating and may soon stop. Thus, the frequency of following drivers not observing a braking signal in time is greatly reduced. Accordingly, the frequency of rear end and other collisions is also reduced.

The reason for having normal brake light operation when either the left or right turn signal lamp is flashing intermittently is as follows. Many early model automobiles and trucks incorporate turn signal and brake lamps into the same lamp and lens assembly. If the flashing brake light function were not inhibited or eliminated by actuation of the turn signals, following drivers would get confusing signal information. For example, if the turn signal were to be actuated to its left turn position and shortly thereafter the driver hit the brakes, the following driver would first see a flashing light on the left side of the vehicle and then in addition a flashing light on the right side of the vehicle. This could cause momentary confusion in the minds of following drivers. Such monentary confusion is directly relatable to accidents due to indecision of drivers.

Figure 2:
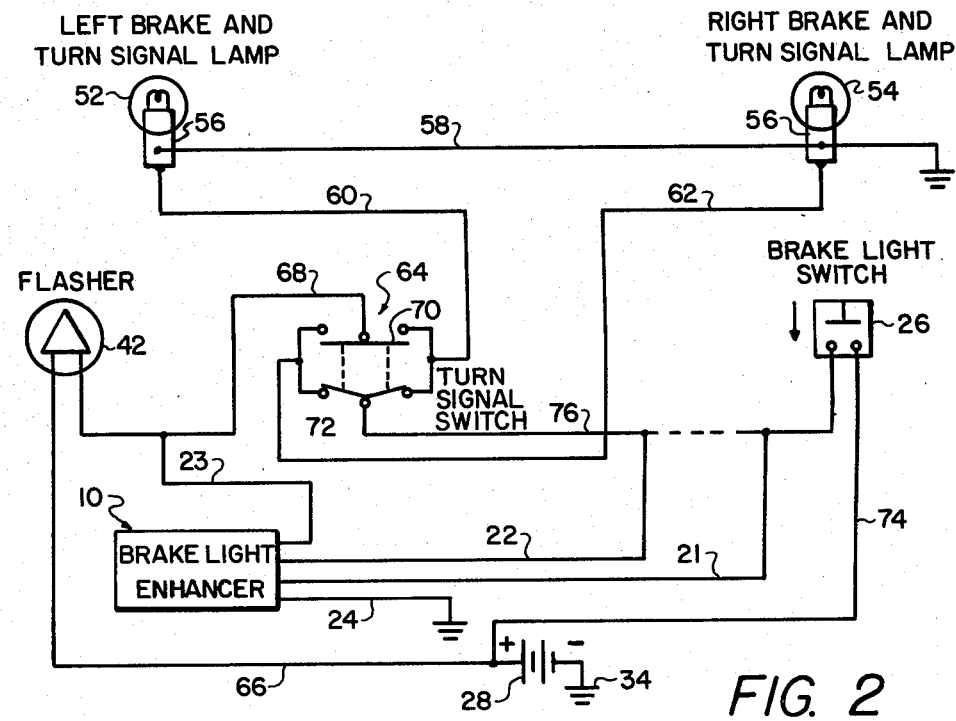
FIG. 2 is a schematic diiagram illustrating the manner in which the brake light enhancer circuit of the present invention may be utilized in a motor vehicle in which the same lamps are utilized as brake and turn signal lamps.

My brake light enhancer circuit 10 may also be utilized in motor vehicles having lighting systems such as that illustrated in FIG. 2. In the FIG. 2 system, the same lamp 52 is used both as the left brake lamp and the left turn signal lamp. Another lamp 54 is utilized both as a right brake lamp and a right turn signal lamp. The system of FIG. 2 is shown with my brake light enhancer circuit 10 connected thereto through leads 21-24. In the system of FIG. 2, the filaments of each of the lamps 52 and 54 are connected on one side to sockets 56 which are connected through a conductor 58 to ground. The other sides of these filaments are connected through conductors 60 and 62 to opposite sides of a turn signal switch 64.

The thermal flasher 42 (FIG. 2) is connected between the positive terminal of the battery 28 via conductor 66 to a center terminal of the turn signal switch 64 via conductor 68. The turn signal switch 64 has a pair of mechanically ganged movable contacts 70 and 72. One side of the brake light switch 26 is connected through a conductor 74 to the positive terminal of the battery 28. The other side of the brake switch 26 is normally connected through a conductor 76 to the movable contact 72.

When my brake light enhancer circuit 10 is added to the vehicle lighting system of FIG. 2, the conductor 76 is cut and the separate segments thereof are connected to the leads 21 and 22 as indicated by the phantom lines. In addition, the lead 23 is connected to the second side of the flasher unit and the lead 24 is grounded.

Conventional operation of the vehicle lighting system illustrated in FIG. 2 before the addition of my brake light enhancer circuit is as follows. When the turn signal switch 64 is in its neutral position, the movable contact 72 provides a connection between the conductor 76 and the conductors 60 and 62. Thus, when the turn signal switch is in its neutral position and the brake light switch 26 is closed, both of the lamps 52 and 54 are continuously illuminated. When the turn signal switch 64 (FIG. 2) is actuated to its left turn position, the right side of the contact 70 makes contact with the portion of the turn signal switch connected to the conductor 60. At the same time, the right portion of the contact 72 is disconnected from the portion of the turn signal switch which is connected to the conductor 60. The left side of the contact 72 maintains the connection between the conductor 76 and the conductor 62. The right side of the contact 70 does not contact the portion of the turn signal switch connected to the conductor 62. Thus, in this condition, intermittent current from the flasher unit 42 flows through the turn signal switch and through the filament of the lamp 52 to ground. The left lamp is thus intermittently energized. If the brake light switch is depressed while the turn signal switch is in its left turn position, then the right lamp 54 will be continuously illuminated throughout the period of time that the brake light switch is closed. Thus, the operation of the brake light switch does not interfere with the turn signal operation. In the situation just described, a following driver would see a flashing left turn signal lamp and a solid right lamp. The flashing lamp would indicate an impending left turn while the solid right lamp would indicate that the driver has applied his or her brakes.

When the turn signal switch 64 (FIG. 2) is actuated to its right turn position, the left side of the upper movable contact 70 makes a connection between the conductor 68 and the conductor 62. At the same time, the left portion of the lower removable contact 72 is disconnected from the portion of the turn signal switch which is connected to the conductor 62. The right portions of these movable contacts remain in their positions shown in FIG. 2. Thus, the right turn signal lamp flashes on and off intermittently. If the brake light switch is depressed, then the left brake lamp is illuminated on a continuous basis. It should be understood that the positions of the left and right portions of the movable contacts 70 and 72 when the turn signal switch is in its neutral position are shown in solid lines in FIG. 2.

When my brake light enhancer circuit 10 is connected to the vehicle lighting system of FIG. 2 by attachment of the leads 21-24 at the locations indicated, the modified operation of the vehicle lighting system is as follows. When the brake light switch is depressed and the turn signal switch is in its neutral position, both brake lamps flash on and off a predetermined number of times and then remain continuously illuminated thereafter so long as the brake light switch is closed. Movement of the turn signal switch to its left or right turn position at any time automatically disables the brake light enhancer circuit 10 so that the vehicle lighting system operates in the conventional manner described above. That is to say, movement of the turn signal switch to its left turn position causes flashing of the left turn signal lamp and subsequent closure of the brake light switch causes the right turn signal lamp to be immediately illuminated on a continuous basis, without flashing on and off. If, during the initial on and off flashing of the brake lights the turn signal switch is moved from its neutral position to either its left or right turn position, the brake light flashing is immediately ceased, and the brake light on the side opposite the flashing turn signal lamp is continuously illuminated.

The electronic circuitry of the preferred embodiment 10 of my brake light enhancer circuit will now be described by way of reference to FIG. 3. A first integrated circuit IC-1 generates a series of pulses when power is received over lead 21 through closure of the brake light switch 26. Resistors R1 and R2 and along with capacitor C2 from a standard astable configuration for the integrated circuit IC-1, causing a pulse of approximately two Hertz with an approximately fifty percent duty cycle. The resistor R4 and the capacitor C1 provide the integrated circuit IC-1 with filtered power. By way of example, the integrated circuit IC-1 may be a type LM555 timer chip manufactured by National Semiconductor Corporation.

Figure 3:
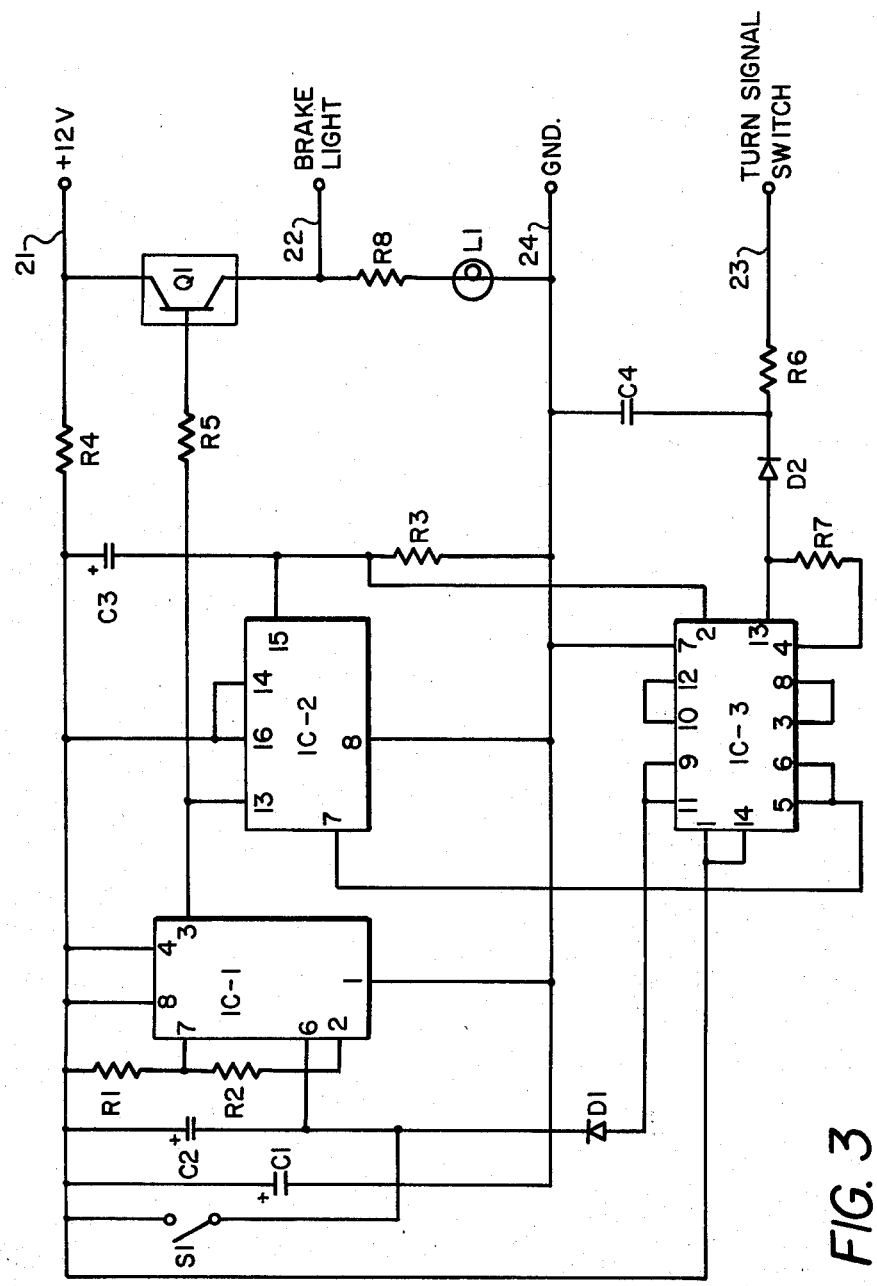
FIG. 3 is a schematic diagram illustrating the solid state circuitry of a preferred embodiment of my brake light enhancer circuit.

The circuit of FIG. 3 is further provided with a manually actuable switch S1, which is kept closed when operation of the vehicle light enhancer circuit is not desired. When operation of the vehicle light enhancer circuit is desired, the switch S1 is open. The switch S1 enables the driver to optionally connect or disconnect the vehicle light enhancer circuit to the standard vehicle lighting system of the automobile. This may be required, for example, when travelling between countries where flashing brake lights are permitted and not permitted.

The switch S1 (FIG. 3), when closed, inhibits the operation of the timer chip IC-1 and causes a steady low voltage on its output. The output of the timer chip IC-1 is applied to a power transistor Q1 through a resistor R5 so that whenever the output of the timer chip is low, the transistor, which operates as a switch, is turned on, allowing power to flow to the brake lights. The power transistor Q1 may be a type 2N6285.

Thus, the switch S1 is manually closed when it is desired to have normal brake light operation. Alternatively the switch S1 is opened when it is desired to enable flashing brake lights as described above. The switch S1 may be a toggle switch mounted on a case or housing enclosing the circuitry of FIG. 3. That case may be mounted underneath the dashboard so that the switch S1 can be conveniently operated.

A decade counter integrated circuit chip IC-2 (FIG. 3) is utilized to count the number of pulses from the timer chip IC-1. The chip IC-2 may be a type 4017 decade counter chip available from Radio Corporation of America (RCA). By making connections to the appropriate ones of the pins of the chip IC-2, that chip may be made to count to a predetermined number, for example any number between zero and nine. In the preferred embodiment, the counter chip IC-2 is connected so that after it counts three pulses from the timer chip, a high voltage signal is generated on the output pin 7 of the counter chip. This high signal is applied to input pin 5 of a quad NAND integrated circuit chip IC-3. This latter chip may be a type 4011 also available from Radio Corporation of America. Application of a high signal to pin 5 of the quad NAND chip IC-3 causes a low voltage to be generated on the output pin 10 of the IC-3. The high voltage signal applied to the input pin 5 of the IC-3 also latches output pin 11 of IC-3 high, which in turn disables the timer chip IC-1 from oscillating. The initial setting of the counter chip IC-2 and of the disable latch IC-3 is determined by a "power on" clear pulse generated by a capacitor C3 and a resistor R3. This pulse clears the counter chip IC-2 to the zero count and resets the disable latch IC-3, allowing the timer chip IC-1 to oscillate.

A lamp L1, receives power through a resistor R8. This lamp may be mounted on the housing for the circuitry of FIG. 3. As previously indicated, preferably that housing is mounted underneath the dashboard so that the lamp L1 may be viewed. During operation of the enhancer circuit, the lamp L1 will mimic the action of the brake lamps so that the driver knows that the brake lamps are flashing on and off and then are remaining on steady. A resistor R7 and a capacitor C4 (FIG. 3) provide filtering for the turn signal connection.

When the turn signal switch is moved from its neutral position to either its left or right turn position, a momentary low voltage signal appears on the lead 23 (FIGS. 1, 2 and 3). This low voltage signal causes the disable latch chip IC-3 to be set which in turn disables the timer chip IC-1 and causes a steady low voltage from its output. As previously indicated, this low voltage turns on the transistor Q1. Thus, when the turn signal switch is turned to either its left or right turn position, on and off flashing of the brake lamps is terminated. The turn signal lamps then operate in their normal fashion. Thus, in the circuit of FIG. 1 above, in the turn signal mode, the brake light enhancer circuit is disabled. Actuation of the turn signal switch to its left turn or right turn position will cause on and off flashing of the appropriate turn signal lamp. Closing of the brake light switch will cause continuous steady illumination of the brake lamps. In the circuit of FIG. 2, in the turn signal mode, one lamp flashes on and off to indicate the appropriate turn, and closure of the brake light switch causes the other lamp to remain steadily on, to indicate deceleration and braking.

The manner in which movement of the turn signal switch to either its left or right turn position will generate a low voltage signal on the lead 23, which in turn disables the brake light enhancer circuit, will now be explained in greater detail. The lead 23 (FIG. 3) of the brake light enhancer circuit is connected to the output side of the flasher 42 (FIGS. 1 and 2). This flasher is a conventional flasher which is normally utilized in automobiles. It has a bi-metal switch which is thermally actuated. When the turn signal switch is in its neutral position, the flasher is in a no load condition. There is a high battery voltage, for example twelve volts, on the side of the flasher to which the lead 23 is connected. When the turn signal switch is moved either to its left or right turn position, a current path to ground, through a lamp filament, is created. The heater wire within the flasher heats up very rapidly, causing the bi-metal strip in the flasher to close a pair of contacts in the flasher. When the contacts close, this creates a much lower resistance than the heater wire and allows current to flow through the filament of the lamp. When the heater wire is shorted, it begins to cool. As the bi-metal strip cools, the contacts within the flasher are broken and again current is forced through the heater wire within the flasher. This once again causes the bi-metal strip to heat and again the contacts close, this cycle continues, thus producing intermittent current to the lamp filament.

At the time when the turn signal switch is first moved to its left or right turn position, the voltage on the output side of the flasher will be low. This is because the resistance of the heater wire within the flasher is very high. This low voltage on the output side of the flasher is used, as previously decribed, to disable the enhancer circuit 10. As indicated above, this low voltage signal from the flasher output is applied to pin 13 of the disable latch IC-3 (FIG. 3). This momentary low voltage signal is used by the IC-3 to set a latch condition. When latching occurs, pins 2 and 6 of the timer chip IC-1 are held in a high state. This high state, disables the timer chip from oscillation and forces its output to a low state, turning transistor Q1 on.

Table I hereafter sets forth values for the resistors, capacitors and diodes of the circuit of FIG. 3 having the IC-1, IC-2, IC-3 and Q1 solid state components designated above:

TABLE I

| R1 | 10k ohms | 5% |
|---|---|---|
| R2 | 68k ohms | 5% |
| R3 | 10 ohms | 5% |
| R4 | 100 ohms | 5% |
| R5 | 3.3k ohms | 5% |
| R6 | 10k ohms | 5% |
| R7 | 100k ohms | 5% |
| R8 | 100 ohms | 5% |
| D1 | Type 1N 4148 | |
| D2 | Type 1N 4148 | |
| C1 | 4.7 uf (25 volts) | |
| C2 | 4.7 uf (25 volts) | |
| C3 | 4.7 uf (25 volts) | |
| C4 | .01 uf (disc type - 50 volts) | |

Having described preferred embodiments of my brake light enhancer circuit, it should be apparent to those skilled in the art that my invention may be modified in both arrangement and detail. Accordingly, the protection afforded my invention should be limited only in accordance with the scope of the following claims.

I claim:

1. In a motor vehicle signal system,
a pair of brake lamps;
a pair of turn signal lamps;
a battery;
a brake light switch connected between the brake lamps and the battery;
a flasher connected between the turn signal lamps and the battery;
a turn signal switch connected between the turn signal lamps and the flasher, the turn signal switch being actuable from a neutral position to left and right turn positions; and
brake light enhancer means connected between the brake lamps, the brake light switch, the flasher and the turn signal switch for causing the brake lamps to flash intermittently and then remain steadily illuminated when the turn signal switch is in its neutral position and the brake light switch is closed, and for causing the brake lamps to remain continuously illuminated when the brake lamps have flashed on and off a predetermined number of times or the turn signal switch is actuated to its left or right turn position.

2. A brake light enhancer circuit for a motor vehicle having left and right rear brake lamps normally continuously illuminated by manual closure of a brake light switch connected between the brake lamps and a battery, and having left and right rear turn signal lamps which are selectively caused to flash intermittently by connecting thereto a flasher connected to the battery through manual actuation of a turn signal switch from a neutral position to a left or right turn position, the brake light enhancer circuit adapted to be connected beween the brake lamps, the brake light switch, the flasher and the turn signal switch, and comprising:
timer means for generating a sequence of pulses in response to the closure of the brake light switch when the turn signal switch is in its neutral position;
switch means for intermittently connecting the brake light switch to the brake lamp in response to the pulses;
means for counting the pulses; and
disabling means for causing the switch means to continuously connect the brake light switch to the brake lamp when a predetermined number of pulses has been counted or when the turn signal switch is actuated to its left or right turn position.

3. In a motor vehicle signal system,
a pair of left and right signal lamps;
a battery;
a brake light switch connected between the lamps and the battery;
a flasher connected between the lamps and the battery;
a turn signal switch connected between the lamps and the flasher, the turn signal switch being actuable from a neutral position to left and right turn positions for causing selective on and off flashing of the left and right lamps; and
brake light enhancer means connected between the lamps, the brake light switch, the flasher and the turn signal switch for causing the lamps to simultaneously flash on and off a predetermined number of times, and then remain steadily illuminated when the turn signal switch is in its neutral position and the brake light switch is closed, and further upon actuation of the turn signal switch to its left turn position during closure of the brake light switch for causing the left lamp to flash on and off intermittently and the right lamp to be steadily illuminated, and further upon actuation of the turn signal switch to its right turn position during closure of the brake light switch to cause the right lamp to flash on and off intermittently and the left lamp to be steadily illuminated.

4. A brake light enhancer circuit for a motor vehicle having left and right signal lamps which are normally simultaneously and continuously illuminated by manual closure of a brake light switch connected between the lamps and a battery, and further having a turn signal switch and a flasher connected between the lamps and the battery, so that movement of the turn signal switch from its neutral position to its left turn position causes the left lamp to flash on and off intermittently and closure of the brake light switch when the turn signal switch is in the left turn position will cause the right lamp to be steadily illuminated, and further wherein movement of the turn signal switch to its right turn position will cause the right lamp to flash on and off intermittently and closure of the brake light switch when the turn signal switch is in its right turn position will cause the left brake lamp to remain steadily illuminated, the brake light enhancer circuit adapted to be connected between the lamps, the brake light switch, the flasher, and the turn signal switch and comprising:

timer means for generating a sequence of pulses in response to the closure of the brake light switch when the turn signal switch is in its neutral position;

switch means for intermittently connecting the brake light switch to the lamps in response to the pulses;

means for counting the pulses; and disabling means for causing the switch means to continuously connect the brake light switch to the lamps when a predetermined number of pulses has been counted or when the turn signal switch is actuated to its left or right turn position.

* * * * *